United States Patent

[11] 3,589,444

| [72] | Inventors | Alvin C. Johnson<br>Mount Carmel, Ill.;<br>Clyde G. Inks, Taylor, Mich. |
| --- | --- | --- |
| [21] | Appl. No. | 875,588 |
| [22] | Filed | Nov. 10, 1969 |
| [45] | Patented | June 29, 1971 |
| [73] | Assignee | Wyandotte Chemicals Corporation<br>Wyandotte, Mich. |

[54] AQUEOUS FLUID DRIVE SYSTEM FOR OIL RECOVERY PROCESSES
7 Claims, No Drawings

[52] U.S. Cl.................................................. 166/274,
166/275, 260/33.4
[51] Int. Cl.................................................. E21b 43/22
[50] Field of Search...................................... 166/273–
–275, 268, 295; 252/8.55 D

[56] References Cited
UNITED STATES PATENTS

| 3,053,765 | 9/1962 | Sparks | 166/274 |
| --- | --- | --- | --- |
| 3,116,791 | 1/1964 | Sandiford et al. | 166/274 |
| 3,261,339 | 7/1966 | Coppel | 166/273 |
| 3,336,977 | 8/1967 | Amott | 166/274 |
| 3,366,175 | 1/1968 | Ferrell et al. | 166/273 |
| 3,412,792 | 11/1968 | Parker et al. | 166/274 |
| 3,431,976 | 3/1969 | Harvey et al. | 166/274 |
| 3,452,817 | 7/1969 | Fallgatter | 166/305 |
| 3,455,386 | 7/1969 | Reisberg | 166/275 |

*Primary Examiner*—Ian A. Calvert
*Attorneys*—Bernard R. Swick, William R. Day, Robert E. Dunn, Joseph D. Michaels and Charles G. Lamb

ABSTRACT: A method for recovering residual oil from a subterranean oil bearing formation by an aqueous fluid drive system includes the steps of (a) introducing into the formation an aqueous slug of a solid high molecular weight polyethylene oxide polymer dispersed in a liquid nonionic surfactant, and (b) thereafter, introducing into the formation an aqueous drive solution containing a minor amount of the polymer dispersed in surfactant composition.

AQUEOUS FLUID DRIVE SYSTEM FOR OIL RECOVERY PROCESSES

The present invention relates to oil recovery processes. More particularly, the present invention concerns waterflood oil recovery processes. In a particular aspect the present invention concerns an aqueous fluid drive system for effectuating a waterflood oil recovery process. In another particular aspect the present invention concerns novel polymeric additives for aqueous fluid drive systems employed in waterflood oil recovery processes.

The recovery of oil from so-called "depleted" oil bearings formations by waterflooding or aqueous fluid drive systems, has given rise to a vast wealth of technology in relation thereto.

Generally speaking, however, an aqueous fluid drive system consists in introducing an aqueous medium or slug into a subterranean oil bearing formation through one or more injection wells which penetrate the strata of the formation. Thereafter the slug is forced through the formation to one or more producing wells by a subsequent aqueous driving medium which, likewise, is injected into the formation. Residual oil is thereby displaced ahead of the slug and is recovered at one or more production wells.

In order to avoid fingering and to ensure that the slug will flow through the formation in a plane front, it is usually provided that the forward front of the slug is of greater viscosity than the residual oil in the formation. This greater viscosity is imparted to the slug by the addition thereto of either a surfactant or a solid, high molecular weight polymer such as a polyoxyethylene glycol, polyacrylamide, polysaccharide, and the like.

However, in all the heretofore known oil recovery systems and methods there are inherent limitations which hinder the realization of a waterflood operating at full efficiency. For example, a surfactant, when admixed with an aqueous solvent, does not impart a sufficient viscosity or mobility ratio to the slug to render the waterflood fully efficient. Polyacrylamide polymers, which are widely employed, tend to go out of solution and irreversibly adsorb in the interstices and walls of the formation. This reduces the permeability of the formation and, thus, may inhibit subsequent recovery processes.

Polyethylene oxide is extremely water-soluble, and provides a viscosity and mobility ratio to an aqueous slug commensurate with that required for an efficient waterflood. But, like the polyacrylamides, as well as the other aforementioned polymers, polyethylene oxide exhibits no surfactant characteristics and therefore does not reduce the interfacial tension between the forward front of the slug and the residual oil. Thus, polyethylene oxide does not increase the wettability of the formation.

Another problem encountered in the prior art is the fact that high operating or injection pressures are necessary to maintain an efficient injection rate. If high pressures are not employed, the injection rates fall. If high injection rates are not maintained, this increases the life of the waterflood and the accompanying expenses. On the other hand, as injection pressures increase there is a greater tendency for the formation to crack. If this occurs, then the waterflood may be shut down completely. Moreover, if a waterflood is shut down for any significant period of time, a slow incremental buildup of both injection rate and pressure is required to return the waterflood to an efficient operating level.

Still another problem arises in aqueous fluid drive systems employing polymer additives which is peculiar thereto. Since a solid cannot be conveniently injected into a flowing aqueous stream, the prior art teaches the admixing and dissolving of the polymer in the aqueous slug prior to its introduction into the formation. However, when aqueous solutions of these polymers are subjected to physical forces such as those exerted by injection means, the polymers dissolved therein undergo shear degradation. In other words, when these aqueous polymeric solutions are forced through a high-pressure pump or the like, the polymers degrade. Degradation reduces the molecular weight of the polymer and therefore its thickening capabilities. This, of course, has an adverse effect on the efficiency of the waterflood. As noted, the problem cannot be rectified by merely introducing a solid polymer into a flowing stream prior to injection into the formation because of the inherent difficulties encountered in attempting to accomplish this.

It is therefore an object of the present invention to provide an improved method for recovering residual oil by an aqueous fluid drive system. It is another object of the present invention to provide a novel aqueous polymeric solution useful in an aqueous fluid drive system wherein the polymer does not shear when subjected to high pressures. Still another object of the present invention is to reduce the life of an oil recovery operation and to provide increased oil recovery by using the polymeric solution of the present invention. A further object of the present invention is to provide an aqueous fluid drive system having an increased injection rate and a reduced injection pressure.

The objects of the present invention are achieved by an oil recovery process for recovering residual oil from a subterranean oil bearing formation by a aqueous fluid drive system which comprises the steps of (1) introducing into the formation an aqueous slug having a polymeric additive dissolved therein, (2) driving the slug through the formation with an aqueous drive solution containing minor amounts of the polymeric additive, and (3) recovering displaced oil ahead of the first slug.

The polymeric additive contemplated for use herein generally comprises a water-soluble composition of a solid, high molecular weight polymer dispersed in a nonionic liquid surfactant. More particularly, the additive consists of a water-soluble composition of solid, high molecular weight polyethylene oxide dispersed in a nonionic liquid surfactant, such as an ethoxylated and propoxylated adduct of a hydrophobic polyol. This composition, which is more fully described in copending patent application, Ser. No. 848,742, filed Aug. 8, 1969, and entitled "Water Soluble Compositions," the disclosure of which is hereby incorporated by reference, overcomes the hereinbefore-mentioned shear degradation problem. Furthermore, the composition imparts to an aqueous solution thereof unexpected properties which are extremely valuable in oil recovery processes employing aqueous fluid drive systems.

It has been found, as will subsequently be shown, that an aqueous slug having the present additive dissolved therein exhibits a synergistic effect in the amount of oil recovered from a waterflood containing the composition. In other words, the oil recovered with a waterflood using the composition is not only greater than that recovered from either a surfactant additive or polymer additive, alone, but is greater than what would be expected from a combination of the two.

Although not wishing to be bound by any theory, it would appear that many factors contribute to this synergistic effect. Initially, the surfactant is able to move through the formation without being adsorbed into the interstices or walls thereof. Also, the surfactant significantly reduces the interfacial tension between the interface of the slug and the residual oil. The polymer, on the other hand, provides viscosity control so that a favorable mobility ratio and formation sweep can be established between the oil and the slug.

It has also unexpectedly been discovered that an aqueous slug having the polymer composition dissolved therein can be injected into subterranean oil bearing formations at high rates and at significantly reduced pressures. Injection rates can be increased to upwards of 30 to 50 percent with aqueous drive systems using the present additives and with an accompanying decrease in pressure of about 30 to 40 percent. Thus, the present aqueous slugs provide a means for reducing the life of the waterflood because of the high injection rates associated therewith. Meanwhile, any possibility of the formation cracking is obviated because of reduced operating pressures.

Additionally, a waterflood which has been dormant for several days, can be returned to the prior injection rate and pressure levels over reduced periods of time.

Only relatively minor amounts of the additive are required to conduct a waterflood exhibiting these unexpected and advantageous properties. The aqueous slug introduced into the formation generally has about from 230 to 12,000 p.p.m. of additive dissolved therein. The driving medium generally has about 40 to 400 p.p.m. of additive dissolved therein.

In a preferred embodiment of the present invention, an aqueous slug having a pore volume of from 0.001 to 0.5 and a concentration of from 1,000 to 5,000 p.p.m. of additive dissolved therein is injected through an injection well into a "depleted" formation by any well-known conventional means operatively connected to the injection well.

The polymeric additive for the slug generally comprises from about 2 percent to 87 percent by weight of solid, high molecular weight polyethylene oxide and from about 13 percent to 90 percent by weight of the surfactant. Preferably, the additive comprises from about 11 percent to 50 percent by weight of polymer and from about 50 to 89 percent by weight of surfactant.

The slug is injected into the formation at a rate of about 500 to 1,000 barrels/day and at a pressure of about 500 to 700 p.s.i. Preferably, the slug is injected at a rate of about 500 to 700 barrels/day under pressure of about 550 to 650 p.s.i.

After the slug is injected into the formation, the slug and the residual oil displaced ahead of the slug are driven through the formation by an aqueous medium, having minor amounts of the polymeric additive dissolved therein, to a production well. The driving medium is either water or a 5 percent brine solution (predominantly NaCl), having a concentration of from about 50 to 150 p.p.m. of polymeric additive dissolved therein. The additive is provided in the driving medium to assure maintenance of the high injection rates and low injection pressure and to reduce corrosion, scaling and the like.

The additive for the driving medium has the same composition as that used in the slug. The only difference being the concentration of composition in the aqueous medium.

The driving medium is injected into the formation at a rate ranging from about 500 to 1,000 barrels per day under a pressure of about 500 to 750 p.s.i.g. Preferably, the driving medium is injected at a rate of about 500 to 700 barrels per day under a pressure of about 550 to 650 p.s.i.

As noted in the previously mentioned copending application, these additives can be introduced to and admixed and dissolved in their respective aqueous media either upstream or downstream of any suitable injection means, such as a high-pressure pump or the like, operatively connected to an injection well.

Because of the nonadsorbing properties of the additive, any subsequent or further recovery processes will in no way be hindered or deterred. Furthermore, the present aqueous fluid drive system is equally adaptable to either a secondary or tertiary oil recovery method.

A more complete understanding of the present invention can be ascertained from the following example of the present invention. In the example all parts and percentages, absent indications to the contrary, are by weight.

EXAMPLE

This example illustrates the synergistic effect provided by the present additives to aqueous fluid drive systems in tertiary oil recovery processes.

A series of graduated 50 ml. burettes, each supported by burette holders, were packed up to the 30 ml. level with Dowell's 20—40 "frac" sand. Each burette was then saturated with water. Thereafter, 30 ml. of crude oil, from BIEHL sandstone, obtained from a formation located in Wabash County, Illinois, was flowed through the burette. The effluent oil was collected and measured in a graduated cylinder. The difference between the amount of oil introduced and the effluent was the amount of oil in the sand-packed burette. Thereafter, a waterflood was simulated by flooding each burette with tap water. The oil recovered from the simulated waterflood was measured and this figure was subtracted from the original volume of oil in the burette to determine the residual oil therein.

A tertiary recovery process was then conducted by introducing into each burette 50 ml. of an aqueous slug containing a concentration of a surfactant consisting of an ethoxylated adduct of a polypropylene glycol having a molecular weight of about 3,000 and an ethylene oxide content of about 60 percent. The amount of oil recovered was thereby determined.

A second series of tertiary recovery processes was conducted on the series of Dowell's 20—40 "frac" sand-packed burettes wherein aqueous slugs containing concentrations of solid, high molecular weight polyethylene oxide dissolved therein, were utilized. Two separate runs were conducted. The procedure employed was exactly the same as that used for the surfactant-containing aqueous slugs.

A third series of tertiary oil recovery processes was conducted utilizing the "frac" sand-packed burettes. In this series, aqueous slugs containing concentrations of polymeric additive were employed. Again, the same procedure as that used for the surfactant-containing slug was followed.

The results of the tests are set forth below in Tables 1—4.

TABLE 1.—TERTIARY OIL RECOVERY WITH AQUEOUS SURFACTANT SOLUTION

| Sand pack | Original oil in pack, in ml. | Residual oil after waterflood, in ml. | Concentration of surfactant in aqueous solution in p.p.m. | Amount of oil recovered with solution in ml. | Percent oil recovery |
|---|---|---|---|---|---|
| 1 | 3.5 | 2.5 | 1,000 | 0.1 | 4.0 |
| 2 | 3.6 | 2.8 | 2,000 | 0.3 | 10.7 |

TABLE 2.—TERTIARY OIL RECOVERY WITH AQUEOUS POLYMERIC SOLUTION

| Sand pack | Original oil in pack, in ml. | Residual oil after waterflood, in ml. | Concentration of polymer [1] in solution in p.p.m. | Amount of oil recovered with solution in ml. | Percent oil recovery |
|---|---|---|---|---|---|
| 3 | 4.0 | 3.2 | 500 | 0.2 | 6.3 |
| 4 | 3.5 | 2.6 | 1,000 | 0.2 | 7.7 |
| 5 | 4.1 | 2.9 | 2,000 | 0.2 | 6.9 |

TABLE 3.—TERTIARY RECOVERY WITH AQUEOUS ADDITIVE [1] CONTAINING SOLUTION

| Sand pack | Original oil in pack, in ml. | Residual oil after waterflood, in ml. | Concentration of polymer [1] in solution in p.p.m. | Amount of oil recovered with solution in ml. | Percent oil recovery |
|---|---|---|---|---|---|
| 10 | 3.5 | 2.6 | 1,500 | 0.4 | 15.4 |
| 11 | 3.8 | 2.9 | 2,000 | 0.6 | 20.7 |
| 12 | 4.1 | 3.3 | 3,000 | 0.7 | 21.2 |

[1] Additive concentration consisted of 1,000 p.p.m. of surfactant and varying polymer concentration.

It can be seen from a comparison of the data, that concentrations of additive approaching 1,500 p.p.m. and above, a synergistic effect occurs. To more fully illustrate this, the following summary of data sets forth expected results and actual results.

TABLE 4.—SUMMARY OF DATA

| A | B | C | D | E | F | G |
|---|---|---|---|---|---|---|
| Concentration of surfactant | Percent oil recovery | Concentration of polymer | Percent oil recovery | Expected recovery (¹) | Actual recovery | Concentration of additive |
| 1,000 | 4.0 | 500 | 6.3 | 10.3 | 15.4 | 1,500 |
| 1,000 | 4.0 | 1,000 | 7.7 | 11.7 | 20.7 | 2,000 |
| 1,000 | 4.0 | 2,000 | 6.9 | 10.9 | 21.2 | 3,000 |

¹ These figures represent the total of column B plus column D.

What we claim is:

1. A method for recovering residual oil from a subterranean oil bearing formation by an aqueous fluid drive system comprising the steps of:
   a. injecting into said formation an aqueous slug having dissolved therein a polymeric additive comprising a solid, high molecular weight polyethylene oxide dispersed in a nonionic liquid surfactant,
   b. driving said slug through said formation by introducing thereinto an aqueous driving medium having minor amounts of said polymeric additive dissolved therein, and
   c. recovering said residual oil displaced ahead of said slug.

2. The method of claim 1 wherein said additive is present in said slug in a concentration ranging from about 1,000 to 5,000 parts by weight per million parts by weight of said slug, and said additive is present in said driving medium in a concentration ranging from about 50 to 150 parts by weight per million parts by weight of said driving medium.

3. The method of claim 2 wherein said additive comprises from about 11 to 50 percent by weight of said surfactant and from about 50 to 89 percent by weight of said polyethylene oxide.

4. The method of claim 3 wherein said surfactant comprises a water-soluble liquid, nonionic oxyalkylated adduct of a hydrophobic polyol.

5. In a waterflood process for recovering residual oil from a subterranean oil bearing formation wherein an aqueous drive system is injected into at least one injection well and residual oil is thereby displaced and recovered at at least one production well, the improvement comprising:
   a. injecting into said formation an aqueous slug having dissolved therein a polymeric additive comprising a solid, high molecular weight polyethylene oxide dispersed in a nonionic liquid surfactant,
   b. driving said slug through said formation, thereby displacing said oil ahead of said slug, by injecting into said formation an aqueous driving medium having minor amounts of said additive dissolved therein, and
   c. recovering said oil at said production well.

6. The method of claim 5 wherein said additive is present in said slug in a concentration ranging from about 1,000 to 5,000 parts by weight per million parts by weight of said slug, and said additive is present in said driving medium in a concentration ranging from about 50 to 150 parts by weight per million parts by weight of said driving medium.

7. The method of claim 6 wherein said additive comprises from about 11 to 50 percent by weight of said surfactant and from about 50 to 89 percent by weight of said polyethylene oxide.